(12) United States Patent
Wallace

(10) Patent No.: US 7,575,612 B2
(45) Date of Patent: Aug. 18, 2009

(54) METHODS AND SYSTEMS FOR GASIFICATION SYSTEM WASTE GAS DECOMPOSITION

(75) Inventor: Paul Steven Wallace, Katy, TX (US)

(73) Assignee: General Electric Company, Schenectady, NY (US)

(*) Notice: Subject to any disclaimer, the term of this patent is extended or adjusted under 35 U.S.C. 154(b) by 640 days.

(21) Appl. No.: 11/263,270

(22) Filed: Oct. 31, 2005

(65) Prior Publication Data

US 2007/0095046 A1     May 3, 2007

(51) Int. Cl.
*B01J 8/00*     (2006.01)
(52) U.S. Cl. .............................. 48/127.9; 48/61; 48/63; 48/89; 48/215; 48/93; 48/94; 60/776; 60/286; 423/648 R; 423/352; 423/415; 222/146.6
(58) Field of Classification Search ...................... 48/61; 422/127; 423/657, 648.1, 658.2; 222/146.6; 60/286
See application file for complete search history.

(56) References Cited

U.S. PATENT DOCUMENTS

| | | | |
|---|---|---|---|
| 2,919,980 A | * | 1/1960 | Klapp et al. .................... 48/63 |
| 3,642,202 A | | 2/1972 | Angelo |
| 4,693,883 A | * | 9/1987 | Fleming ................... 423/658.2 |
| 6,048,510 A | * | 4/2000 | Zauderer ..................... 423/235 |
| 2005/0193741 A1 | * | 9/2005 | Iasillo et al. ................... 60/776 |

FOREIGN PATENT DOCUMENTS

| | | |
|---|---|---|
| DE | 44 07 651 C1 | 10/1995 |
| WO | 2006 073713 A1 | 7/2006 |

OTHER PUBLICATIONS

International Search Report for PCT/US2006/040781; Mar. 2, 2007; 5 pages.

* cited by examiner

*Primary Examiner*—Alexa D. Neckel
*Assistant Examiner*—Kaity V. Handal
(74) *Attorney, Agent, or Firm*—Armstrong Teasdale LLP

(57) ABSTRACT

Methods and systems for decomposing ammonia in a gasifier are provided. The system includes a gasifier including a pressure vessel and an injection nozzle extending through the pressure vessel and including a nozzle tip at a distal end of the injection nozzle, the injection nozzle further includes a passage configured to direct a fluid stream including ammonia proximate the nozzle tip such that the fluid stream including ammonia facilitates reducing a temperature of at least a portion of the nozzle tip.

5 Claims, 2 Drawing Sheets

METHODS AND SYSTEMS FOR GASIFICATION SYSTEM WASTE GAS DECOMPOSITION

BACKGROUND OF THE INVENTION

This invention relates generally to integrated gasification combined-cycle (IGCC) power generation systems, and more specifically to methods and apparatus for decomposing waste gases in IGCC systems.

At least some known IGCC systems include a gasification system that is integrated with at least one power producing turbine system. For example, known gasifiers convert a mixture of fuel, air or oxygen, steam, and/or limestone into an output of partially combusted gas, sometimes referred to as "syngas". The hot combustion gases are supplied to the combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides electrical power to the power grid.

At least some known gasification processes generate flows of ammonia. For example, a small amount of byproduct ammonia is produced in the gasifier from organic nitrogen. In the hydrocarbon feed typically 5-15% of the organic nitrogen is converted to ammonia. This ammonia is then concentrated in the syngas condensate. The condensate is stripped and the ammonia rich vapor is sent to the reducing section of the claus boiler, in a sulfur recovery unit. However, some known bottoms gasification applications (e.g. oil field), sour gas reinjection is used instead of a sulfur unit. Additionally, other known applications use existing refinery sulfur units where integration of ammonia rich sour water stripper overhead may be problematic. Moreover, a direct oxidation sulfur recovery method does not include a high temperature furnace and thus would not be able to decompose ammonia.

BRIEF DESCRIPTION OF THE INVENTION

In one embodiment, a gasifier includes a pressure vessel and an injection nozzle extending through the pressure vessel and including a nozzle tip at a distal end of the injection nozzle, the injection nozzle further includes a passage configured to direct a fluid stream including ammonia proximate the nozzle tip such that the fluid stream including ammonia facilitates reducing a temperature of at least a portion of the nozzle tip.

In another embodiment, a method of decomposing a waste gas includes stripping the waste gas from a stream of condensate from a pressure vessel and injecting the waste gas into the pressure vessel at a region of thermal energy such that the waste gas is converted to a byproduct using the thermal energy.

In yet another embodiment, a gasification system includes a pressure vessel and an ammonia stripper coupled in flow communication with said pressure vessel wherein the stripper is configured to receive a flow of condensate comprising ammonia from an output of said pressure vessel, remove at least a portion of the ammonia from the condensate, return the removed ammonia to the pressure vessel at a pressure greater than the pressure of the pressure vessel, and decompose at least a portion of the returned ammonia.

DETAILED DESCRIPTION OF THE INVENTION

Figure 1:
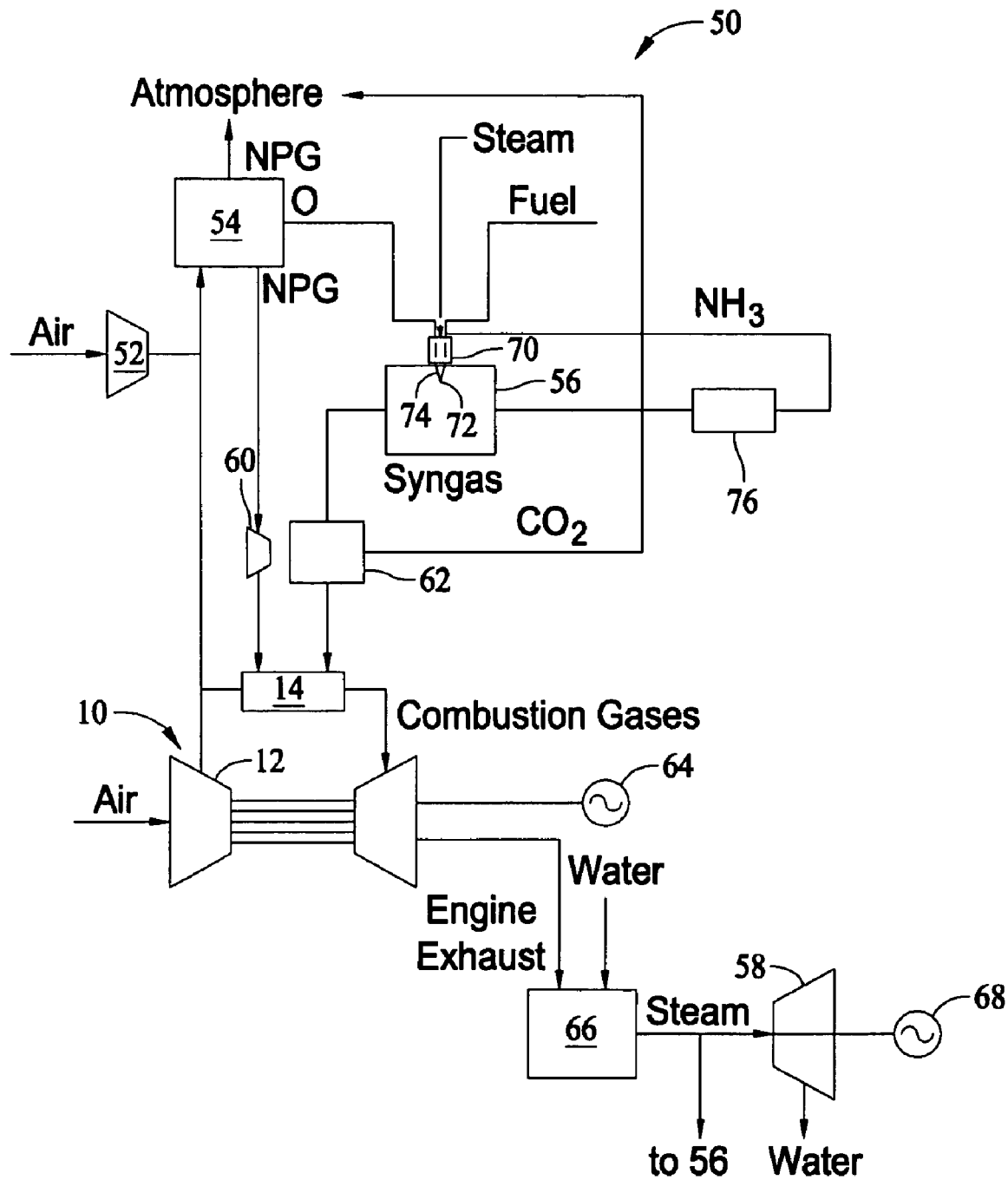
FIG. 1 is a schematic diagram of an exemplary known integrated gasification combined-cycle (IGCC) power generation system.

FIG. 1 is a schematic diagram of an exemplary known integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and will be referred to herein as "nitrogen process gas". The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 52 may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 52 for generating the syngas.

In the exemplary embodiment, gasifier 56 includes an injection nozzle 70 extending through gasifier 56. Injection nozzle 70 includes a nozzle tip 72 at a distal end 74 of injection nozzle 70. Injection nozzle 70 further includes a port (not shown in FIG. 1) that is configured to direct a stream of fluid proximate nozzle tip 72 such that the stream of fluid facilitates reducing a temperature of at least a portion of nozzle tip 72. In the exemplary embodiment, injection nozzle 70 is configured to direct a stream of ammonia proximate nozzle tip 72 such that the stream of ammonia facilitates reducing a temperature of at least a portion of nozzle tip 72.

In the exemplary embodiment, IGCC system 50 includes a syngas condensate stripper configured to receive condensate from a stream of syngas discharged from gasifier 56. The condensate typically includes a quantity of ammonia dissolved in the condensate. At least a portion of the dissolved ammonia is formed in gasifier 56 from a combination nitrogen gas and hydrogen in gasifier 56. To remove the dissolved ammonia from the condensate the condensate is raised to a temperature sufficient to induce boiling in the condensate. The stripped ammonia is discharged from stripper 76 and returned to gasifier 56 at a pressure higher than that of the gasifier, to be decomposed in the relatively high temperature region of the gasifier proximate nozzle tip 72. The ammonia is injected such that the flow of ammonia in the vicinity of the high temperature area proximate nozzle tip 72 facilitates cooling nozzle tip 72.

Figure 2:
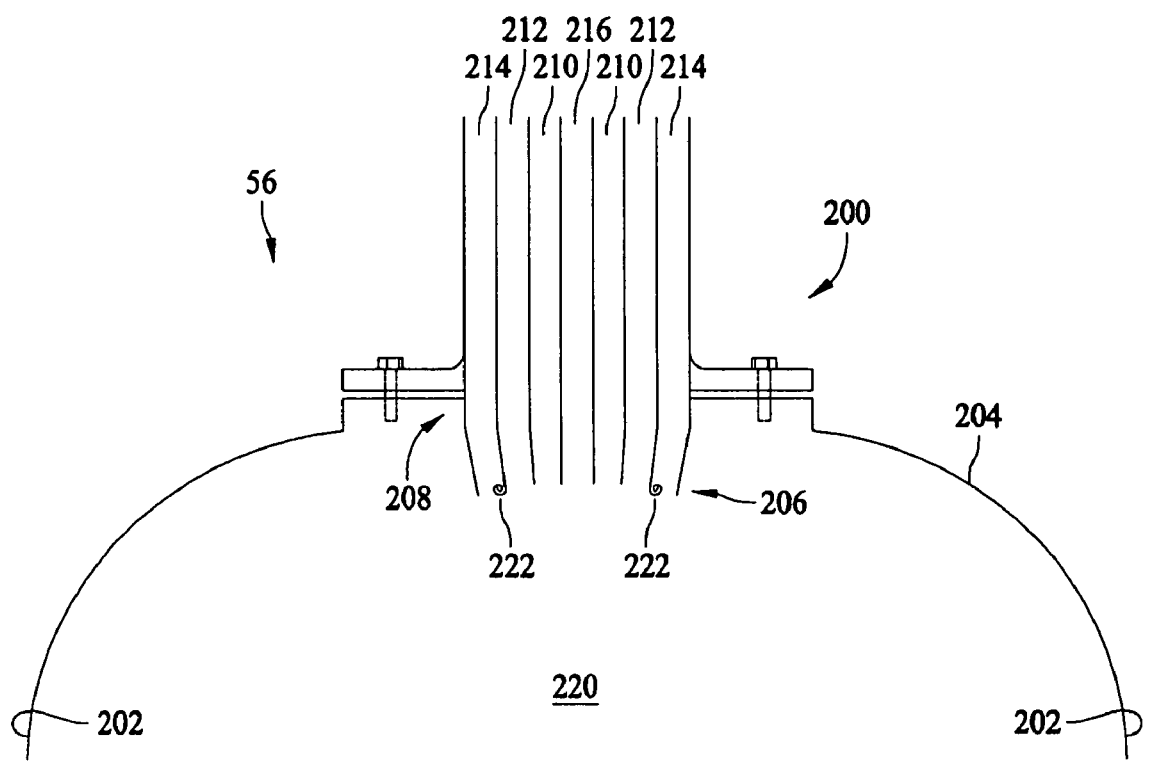
FIG. 2 is a schematic view of an exemplary injection nozzle that may be used with a pressure vessel, such as, the gasifier shown in FIG. 1.

FIG. 2 is a schematic view of an exemplary injection nozzle 200 that may be used with a pressure vessel, such as, gasifier 56 (shown in FIG. 1). Injection nozzle 200 extends through a sidewall 202 or head 204 of gasifier 56. Injection nozzle 200 includes a nozzle tip 206 at a distal end 208 of injection nozzle 200 and further includes a plurality of co-axial annular passages 210, 212, and 214 extending from outside gasifier 56 to nozzle tip 206. In various embodiments, injection nozzle 200 includes a central passageway 216, alternatively central passageway 216 is blocked, not used, or non-existent. Each of passageways 210, 212, 214, and 216 is configured to transport at least one of a carbonaceous feedstock, air, oxygen, steam, and ammonia into gasifier 56. Each of passageways 210, 212, 214, and 216 is sized and oriented to predetermined parameters to facilitate optimizing mixing of the at least one of a carbonaceous feedstock, air, oxygen, steam, and ammonia.

In the exemplary embodiment, passageway 216 is configured to transport at least one of air, oxygen, and steam into gasifier 56. Passageway 210 is positioned radially outward from passageway 216 and is configured to transport at least one of a carbonaceous feedstock and steam into gasifier 56. Passageway 212 is positioned radially outward from passageway 210 and is configured to transport at least one of air, oxygen, and steam into gasifier 56. Passageway 214 is positioned radially outward from passageway 212 and is configured to transport ammonia into gasifier 56. In various other embodiments, the particular passageway transporting the various fluids may vary and the fluid composition may vary from the composition described in the exemplary embodiment. For example, passageway 214 may be configured to transport a fluid other than ammonia into gasifier 56.

In operation, a flow of air, oxygen, and/or steam flowing through and exiting passageway 216 tends to atomize and aerate a slurry of carbonaceous feedstock flowing through and exiting passageway 210. Due to heat energy in a discharge area 220, components of the carbonaceous feedstock at least partially combust, generating additional heat in area 220. A flow of air, oxygen, and/or steam flowing through and exiting passageway 212 tends to further atomize and aerate the slurry of carbonaceous feedstock flowing through and exiting passageway 210. The flow of air, oxygen, and/or steam exiting passageway 212 generates an eddy 222 proximate nozzle tip 206. Eddy 222 generates a hot spot on nozzle tip 206 adjacent passageway 212. A flow of ammonia or other fluid through passageway 214 and exiting nozzle tip 206 in the vicinity of eddy 222 facilitates extinguishing, dispersing and repositioning eddy 22 away from nozzle tip 206. The flow through passageway 214 also facilitates cooling nozzle tip 206.

Injecting waste ammonia from stripper 76 into gasifier 56 at nozzle tip 206 also provides a decomposing energy for converting the ammonia into nitrogen and hydrogen gas without the use of a high temperature reducing furnace as such is a part of a typical sulphur unit or the use of a catalytic reactor.

Exemplary embodiments of gasification systems and methods of decomposing waste ammonia are described above in detail. The gasification system components illustrated are not limited to the specific embodiments described herein, but rather, components of each system may be utilized independently and separately from other components described herein. For example, the gasification system components described above may also be used in combination with different IGCC system components.

While the invention has been described in terms of various specific embodiments, those skilled in the art will recognize that the invention can be practiced with modification within the spirit and scope of the claims.

What is claimed is:

1. A gasification system comprising:
   a pressure vessel;
   an ammonia stripper coupled in flow communication with said pressure vessel, said stripper configured to:
      receive a flow of condensate comprising ammonia from an output of said pressure vessel;
      remove at least a portion of the ammonia from the condensate; and
      return the removed ammonia to the pressure vessel at a pressure greater than the pressure of the pressure vessel; and
   an injection nozzle extending through said pressure vessel and comprising a nozzle tip at a distal end of the injection nozzle, said injection nozzle further comprising a first co-axial annular passage configured to transport a stream comprising oxygen into said pressure vessel wherein said stream forms an eddy at said tip; and a second co-axial annular passage configured to transport a stream comprising ammonia into said pressure vessel wherein said nozzle is further configured to direct the stream of ammonia toward the eddy such that the eddy is at least extinguished, dispersed and repositioned away from said tip.

2. A gasification system in accordance with claim 1 wherein said injection nozzle comprises a plurality of co-axial annular passages.

3. A gasification system in accordance with claim 2 wherein said injection nozzle comprises a co-axial annular passage configured to transport ammonia.

4. A gasification system in accordance with claim 2 wherein said injection nozzle comprises a co-axial annular passage configured to transport at least one of a carbonaceous feedstock, air, oxygen, steam, and ammonia into said pressure vessel.

5. A gasification system in accordance with claim 2 wherein said second co-axial annular passage is positioned outward from said first co-axial annular passage.

* * * * *

UNITED STATES PATENT AND TRADEMARK OFFICE
CERTIFICATE OF CORRECTION

| | | |
|---|---|---|
| PATENT NO. | : 7,575,612 B2 | Page 1 of 1 |
| APPLICATION NO. | : 11/263270 | |
| DATED | : August 18, 2009 | |
| INVENTOR(S) | : Paul Steven Wallace | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Seventh Day of September, 2010

David J. Kappos
*Director of the United States Patent and Trademark Office*